(12) United States Patent
Saint-Hilaire et al.

(10) Patent No.: US 7,136,364 B2
(45) Date of Patent: Nov. 14, 2006

(54) MAINTAINING A RELIABLE LINK

(75) Inventors: Ylian Saint-Hilaire, Hillsboro, OR (US); Frederick William Strahm, Hillsboro, OR (US); Changwen Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 543 days.

(21) Appl. No.: 09/821,776

(22) Filed: Mar. 29, 2001

(65) Prior Publication Data

US 2002/0142774 A1    Oct. 3, 2002

(51) Int. Cl.
*H04Q 7/00*   (2006.01)
*H04Q 7/24*   (2006.01)

(52) U.S. Cl. .................... 370/331; 370/401; 370/428

(58) Field of Classification Search ................ 370/331, 370/338, 401, 428, 463, 465, 469, 419–420; 714/747–749; 455/436, 437, 439
See application file for complete search history.

(56) References Cited

U.S. PATENT DOCUMENTS

| | | | | |
|---|---|---|---|---|
| 5,212,806 A | * | 5/1993 | Natarajan | 455/525 |
| 5,564,070 A | * | 10/1996 | Want et al. | 455/507 |
| 5,751,719 A | * | 5/1998 | Chen et al. | 370/473 |
| 5,940,371 A | * | 8/1999 | Mitts et al. | 370/236 |
| 5,974,036 A | * | 10/1999 | Acharya et al. | 370/331 |
| 6,122,514 A | * | 9/2000 | Spaur et al. | 455/448 |
| 6,137,802 A | * | 10/2000 | Jones et al. | 370/401 |
| 6,161,123 A | * | 12/2000 | Renouard et al. | 709/203 |
| 6,389,005 B1 | * | 5/2002 | Cruickshank | 370/352 |
| 6,418,128 B1 | * | 7/2002 | Takagi et al. | 370/328 |
| 6,522,880 B1 | * | 2/2003 | Verma et al. | 455/436 |
| 6,611,547 B1 | * | 8/2003 | Rauhala | 370/331 |
| 6,658,252 B1 | * | 12/2003 | Mohebbi | 455/437 |
| 6,678,523 B1 | * | 1/2004 | Ghosh et al. | 455/442 |
| 6,768,726 B1 | * | 7/2004 | Dorenbosch et al. | 370/331 |
| 6,826,154 B1 | * | 11/2004 | Subbiah et al. | 370/236 |

OTHER PUBLICATIONS

Woo, W.; Leung, V.C.M.; 1996 5th IEEE International Conference on Universal Personal Communications, vol. 2, Sep. 29-Oct. 2, 1996 pp. 760-764 vol. 2.*

* cited by examiner

*Primary Examiner*—Seema S. Rao
*Assistant Examiner*—Robert C. Scheibel, Jr.
(74) *Attorney, Agent, or Firm*—Fish & Richardson P.C.

(57) ABSTRACT

Maintaining a reliable link includes altering a record of information transmitted across a network from a mobile unit to a destination based on an acknowledgment by the destination of receipt of the transmitted information and transmitting information from the mobile unit to the destination based on the record after the mobile unit establishes a new interface connection to the destination.

14 Claims, 5 Drawing Sheets

MAINTAINING A RELIABLE LINK

BACKGROUND

This invention relates to maintaining a reliable link.

Mobile nodes include devices such as laptop and portable computers, personal digital assistants, telephones, and other wireless or personal devices may be capable of connecting to a network from varied locations. To connect to an Internet Protocol (IP) based network, for example, a mobile node just needs to be attached to a network to establish a network presence that allows information to be sent between the mobile node and arbitrary points in the IP network.

Figure 1:
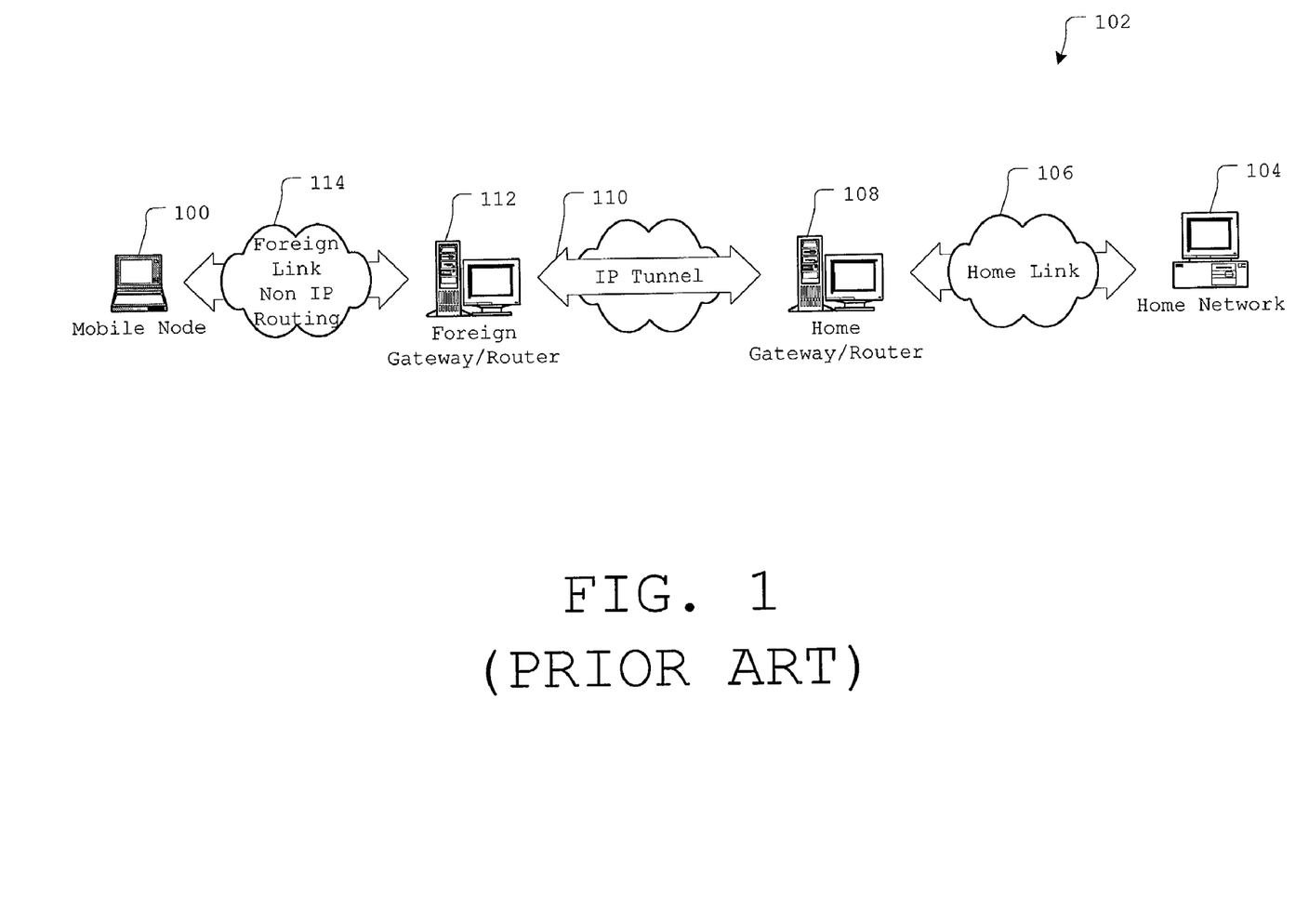
FIG. 1 (PRIOR ART) is a block diagram of a network arrangement.

Referring to FIG. 1, for example, a mobile node 100 can wirelessly and continuously be connected to a network infrastructure 102 using the same IP address regardless of the mobile node's physical location. The mobile node 100 is identified by a home address associated with the mobile node's home network 104. When the mobile node 100 connects to the network infrastructure 102 away from its home link 106, the mobile node 100 is identified by the home address and by at least one care-of address providing information about the mobile node's current location.

Information sent across the network infrastructure 102 to the mobile node's home address is transparently routed to the mobile node's care-of address. The information destined for the mobile node's home address is received at the home link 106 by a home gateway or router 108 that tunnels the information to the mobile node's care-of address via an IP tunnel 110. The care-of address may be an address for a foreign gateway or router 112 that forwards the information to the mobile node 100 over a foreign link 114 that may or may not use IP routing.

As the mobile node 100 changes its physical location and switches to a different foreign gateway or router to maintain connectivity to the network infrastructure 102, the mobile node 100 updates the home gateway or router 108 with its new care-of address. In this way, the mobile node 100 can relocate, connect to various foreign gateways or routers, and maintain a constant IP address presence without interruptions or disturbances in network connectivity. In switching between foreign gateways or routers, however, information may be lost in transit from the mobile node 100 to the home network 104.

DESCRIPTION

Figure 2:
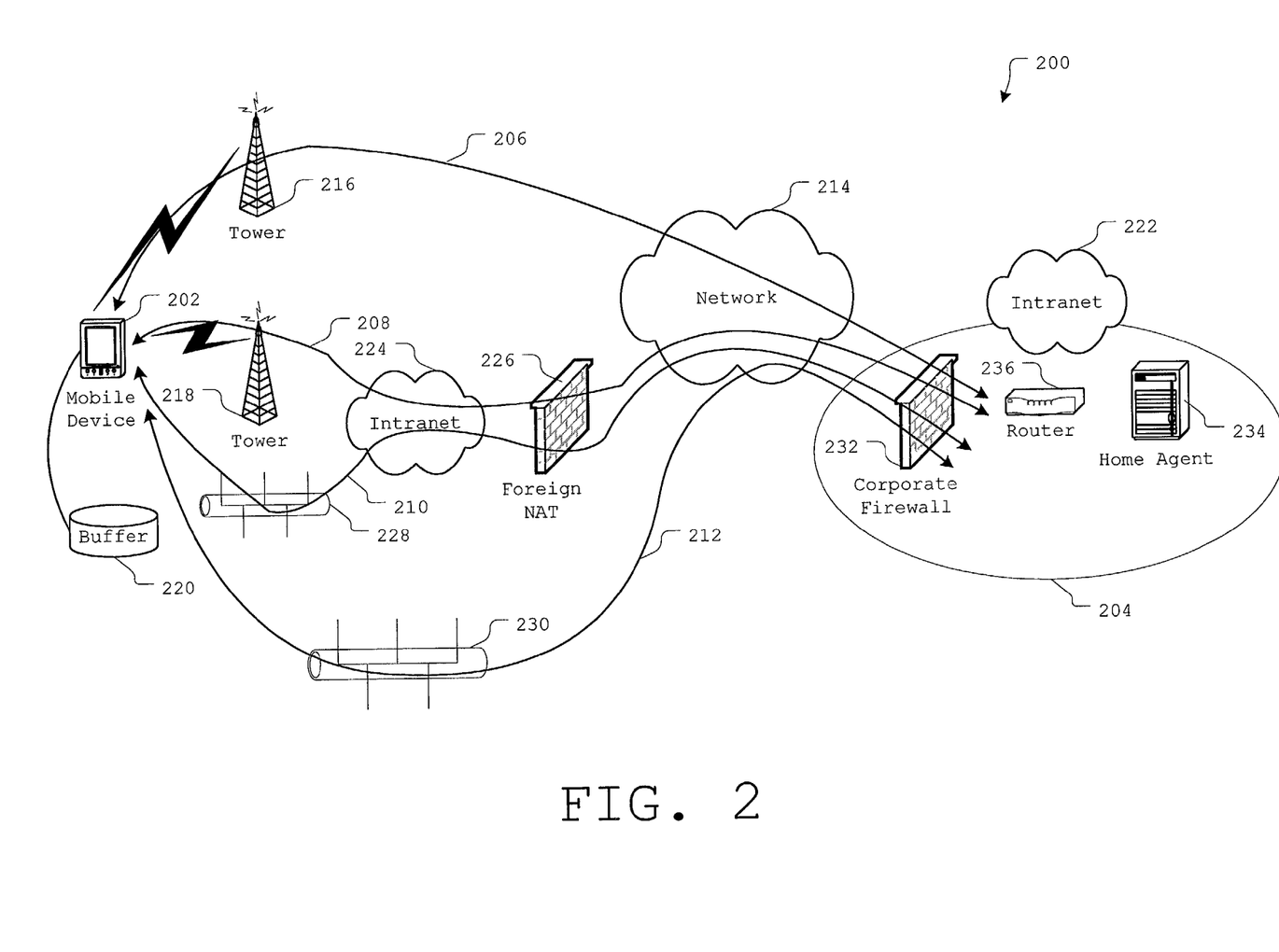
FIGS. 2–3 are block diagrams of simplified network configurations.

Referring to FIG. 2, in an example of a network configuration 200, a mobile unit (mobile device) 202 can establish a reliable Transmission Control Protocol (TCP) connection (TCP tunnel) with a home network 204 across a network 214 using an available network interface. Examples of such network interfaces include a wireless interface 206, a wireless local area network (LAN) interface 208, a wired network interface 210, a direct wired interface 212, and other similar interfaces. Each of the interfaces 206, 208, 210, and 212 is described further below.

If the mobile device 202 loses its established connection with the home network 204, the mobile device 202 can establish another connection with the same or different interfaces. The switch between the two connections is called a handoff. If the mobile device 202 and the home network 204 expect reliable communications, information transmitted from the mobile device 202 to the home network 204 must not be lost during or after the handoff.

The mobile device 202 may lose connectivity for a variety of reasons. For example, a wire included as part of the established connection may be unplugged, be disconnected at detection of a security breach, be disconnected after a certain amount of elapsed time without receiving an acknowledgment of received information from the home network 204, or otherwise be disconnected. In another example, the mobile device 202 may move out of range of a wireless transmitter or base station (e.g., a first transmitter 216 or a second transmitter 218) associated with the established connection.

To help maintain a reliable connection between the mobile device 202 and the home network 204 during a handoff, the mobile device 202 can use a buffer 220 to keep track of information transmitted to the home network 204. Generally, when the mobile device 202 transmits information to the home network 204, the mobile device 202 counts the amount of information transmitted and keeps a copy of the transmitted information in the buffer 220. When the home network 204 receives information from the mobile device 202, the home network 204 counts the received information and communicates an acknowledgment of the counted information to the mobile device 202. The mobile device 202 removes the information associated with the acknowledgment from the buffer 220.

In this way, the mobile device 202 can keep track of the information transmitted to the home network 204 and the information successfully received by the home network 204. Furthermore, when a handoff occurs, the mobile device 202 can use the acknowledgment and the information included in the buffer 220 to determine what information to transmit and/or retransmit to the home network 204 to help preserve a reliable link and ensure that the home network 204 successfully receives all transmitted information. Similarly, in the opposite direction, a home agent 234 can maintain information sent to the mobile device 202.

Turning to the examples of interfaces mentioned above, the wireless interface 206 may include a wireless phone link using the first transmitter 216 and a wireless communications system such as a third generation (3G) wireless system, a second-and-a-half generation (2.5G) wireless system, General Packet Radio Service (GPRS), i-mode™ (NTT DoCoMo, Japan), Global System for Mobile (GSM) Communications, Code Division Multiple Access (CDMA), Time Division Multiple Access (TDMA)/Digital Advanced Mobile Phone Service (D-AMPS), or other similar system. The wireless interface 206 can be a modem connection that is relayed to an Internet Service Provider (ISP) that connects the mobile device 202 to the network 214.

The wireless LAN interface 208 may include a wireless connection to a LAN 224. The LAN 224 may be provided by a wireless Ethernet, Bluetooth, the Institute of Electrical and Electronics Engineers (IEEE) 802.11b standard (IEEE std. 802.11b-1999, published September 1999), Cellular Digital Packet Data (CDPD) connections, or other similar system. Information transmitted along the wireless LAN interface 208 may traverse through the second transmitter 218 to the LAN 224 and through a foreign Network Address Translation (NAT) proxy 226 from the LAN 224 to the network 214.

The wired network interface 210 may include a wired network connection through a connected network 228 such as an Ethernet. Information transmitted through the wired network interface 210 may traverse through the LAN 224 and the foreign NAT proxy 226 on its way to the network 214.

The direct wired interface 212 may include a direct connection 230 to the network 214, such as through a Digital Subscriber Line (DSL) connection, an Integrated Services Digital Network (ISDN) connection, a cable modem connection, or other similar connection.

The interface used by the mobile device 202 may connect to the home network 204 through a security mechanism such as a corporate firewall 232. Once the information is allowed through the corporate firewall 232, a router 236 can route the information to its proper destination (e.g., an Intranet 222, the home agent 234 such as a wireless data processing center, etc.). In this example, the destination is the home agent 234 (although the information's ultimate destination may be an application accessible by the home agent 234).

The elements in FIG. 2 can be implemented in a variety of ways. The mobile device 202 and the home network 204 are not limited to communicating with each other across an interface using the TCP protocol. Any protocol that offers reliability such as TCP, modified forms of TCP, reliable User Datagram Protocol (UDP), reliable layer two links, and other similar protocols can be used in the network configuration 200 and adapted to the described examples. Reliability in this context generally refers to transparently providing seamless connectivity, e.g., error detection, flow control, packet recovery, bandwidth control, security, etc., even if the interface between the mobile device 202 and the home network 204 changes.

The information communicated between the mobile device 202 and the home network 204 can include a packet including a full or partial IP packet (datagram) for some application included at the sender (either the mobile device 202 or the home network 204). The packet can include data (e.g., text, numbers, Boolean content, addresses, graphical content, and the like), instructions (e.g., commands, requests, queries, and the like), or a combination of the two. Each sent packet may be part of a packet stream, where the packets in the packet stream fit together to form a contiguous group of data/instructions.

The network 214 typically includes a public network such as an Internet or other similar network. Communications through the network 214 may be secured with a mechanism such as Transport Layer Security/Secure Socket Layer (TLS/SSL), wireless TLS (WTLS), or secure Hypertext Transfer Protocol (S-HTTP).

The home network 204, the Intranet 222, and the LAN 224 can each include any portion of a network that shares an independent, interconnected segment or domain such as a local area network (LAN) having a common address prefix or other similar network.

The mobile device 202 can include any device capable of communicating with the network 214 such as a mobile computer, a stationary computer, a telephone, a pager, a personal digital assistant, a key pad, an audio and/or video player, or other similar device.

The mobile device 202 may itself maintain or otherwise have access to the buffer 220. The buffer 220 can include any storage mechanism, such as a cache, a data queue, a buffer, a local or remote memory device, or other similar mechanism. The buffer 220 need not be any particular size.

The home agent 234 can include any device capable of communicating with the mobile device 202 and the network 214 such as a file server, a mobile computer, a stationary computer, a telephone, a pager, a personal digital assistant, or other similar device.

The interfaces 206, 208, 210, and 212 generally include routes for sending and/or receiving information. The interfaces 206, 208, 210, and 212 can include any kind and any combination of communication links such as modem links, wireless links, Ethernet links, cables, point-to-point links, infrared connections, fiber optic links, cellular links, Bluetooth, satellite links, and other similar links.

The network configuration 200 has been simplified for ease of explanation; the network configuration 200 may include additional elements such as networks, communication links, proxy servers, firewalls, or other security mechanisms, Internet Service Providers (ISPs), and other elements.

Figure 3:
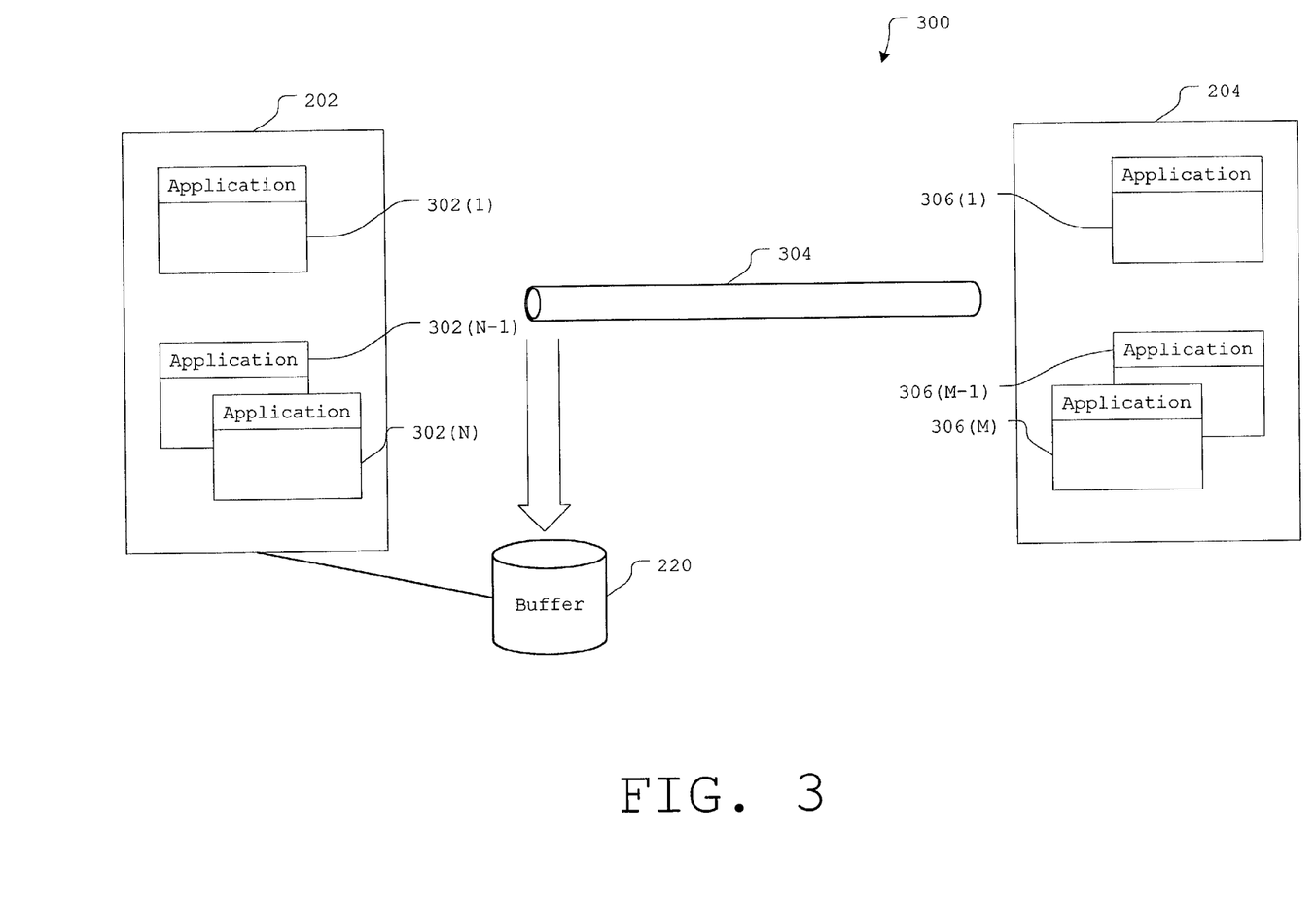

Referring to FIG. 3, in another view 300 of the network configuration 200 of FIG. 2, the mobile device 202 includes mobile applications 302(1)–302(N). The applications 302(1)–302(N) may each attempt communications over an interface 304 (e.g., one of the interfaces 206, 208, 210, or 212) with home applications 306(1)–306(M) included in the home network 204. (N and M each represent whole numbers.) The home applications 306(1)–306(M) may run on the home agent 234 or on another device (e.g., a local or remote server, a local or remote server farm, etc.) accessible through the home network 204. For simplicity in this example, only one application 302(1) included in the mobile device 202 ("mobile application" 302) is discussed as attempting to communicate with one application 306(1) ("home application" 306) accessible by the home agent 234.

Generally, an application is a software-based configuration program, for example, that runs on a system having processing capabilities such as a mobile or stationary telephone, computer, server, or other device. The applications 302(1)–302(N) and 306(1)–306(M) can each include a collection of functions and/or data stored in binary format (or a combination of binary format and text format) and configuration information associated with the collection of functions and/or data.

Examples of the applications 302(1)–302(N) and 306(1)–306(M) include:

a) a file that a unit directly executes such as an executable (EXE) file, a command (COM) file, a drive (DRV) file, a phone (FON) file, and other similar files, b) a collection of files that a unit directly executes such as a dynamic link library (DLL) and other similar collections of files, c) a routine or application program interface (API) such as Adobe Acrobat™, Paintshop Pro™, and other similar routines and APIs, d) a proxy acting on behalf of another device, and e) network software.

Figure 4:
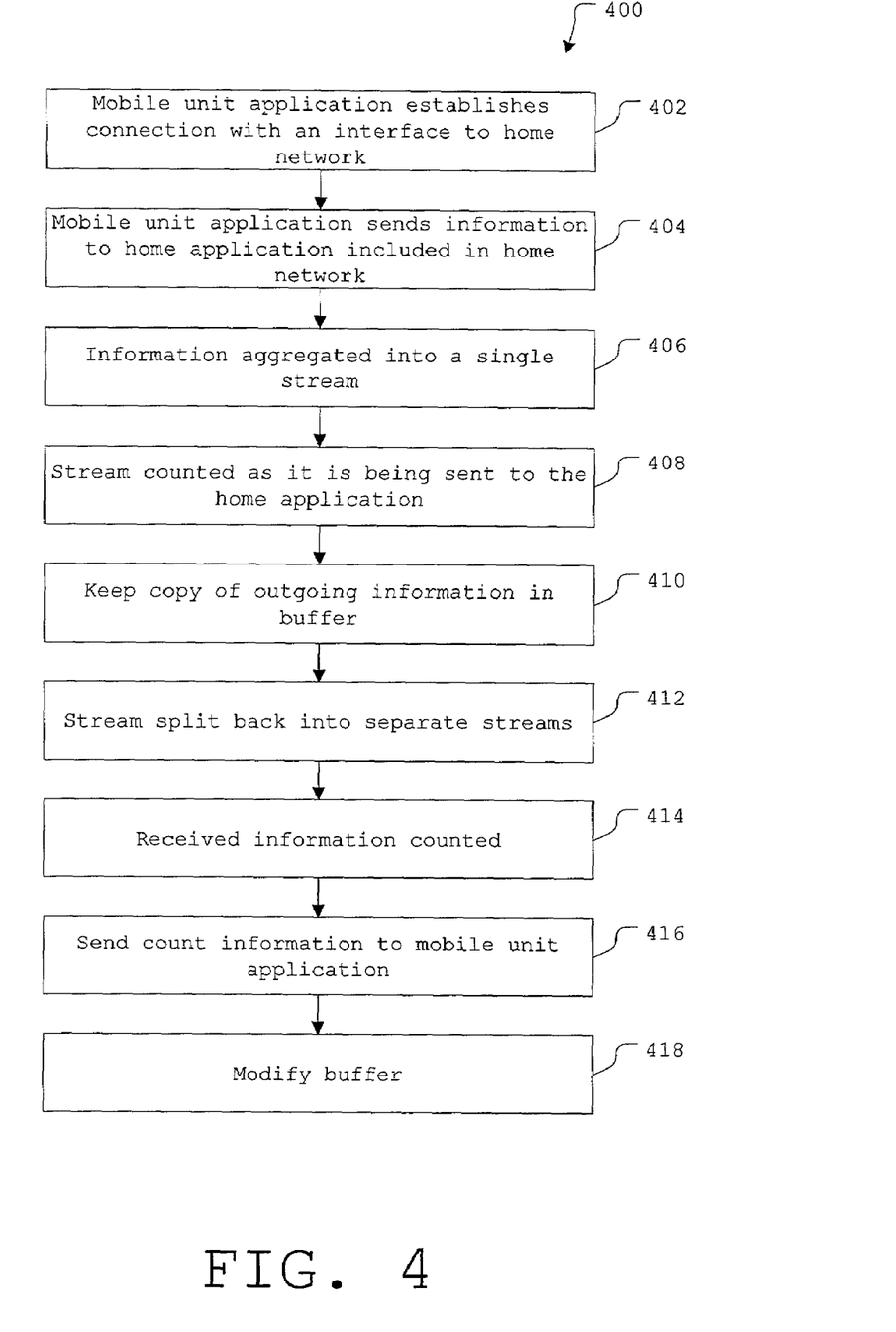
FIGS. 4 and 5 are flowcharts showing processes of transmitting information.

Referring to FIG. 4, a transmission process 400 illustrates an example of how the mobile application 302 and the home application 306 may communicate with each other over the interface 304. The mobile device 202 uses an available interface to establish 402 a connection to the home network 204. The established interface is called the active interface while other, unused available interfaces are called passive interfaces.

A variety of interfaces may be available to the mobile device 202 to set a connection. The mobile device 202 may choose an available interface to be the active interface based on an order of preference. An example of an order of preference from most preferable to least preferable may be: a) wired Ethernet, b) short distance, low power Bluetooth, c) medium distance IEEE 802.11b, d) long distance CDPD.

The mobile device 202 and/or the home agent 234 may be able to determine if additional interfaces should be opened (i.e., be made available). For example, parameters can be set for opening interfaces based on factors such as a fee levied for using a particular interface, connection speed, signal strength, latency, battery drain, power load, and available security. The mobile device 202 may be able to detect its geographic location to determine if it is in transit or is leaving the effective range of its active interface, and thereby evaluate signal strength, using a mechanism such as a global positioning system (GPS). Such parameters may also be used by the mobile device 202 and/or the home agent 234 to determine if the active interface should be switched to a passive interface or if available interfaces should be closed.

The mobile application 302 transmits 404 information destined for the home application 306 to the home network 204 using the active interface 304. The mobile application 302 may direct the information into the active interface 304 in various ways. The mobile device 202 may notify the mobile application 302 of the active interface 304 and the mobile application 302 can direct information to the active interface 304. In another example, the mobile application 302 may direct the information to another mechanism included in the mobile device 202, such as a network interceptor, a proxy, or a routing mechanism that routes the information to the active interface 304. In yet another example, the mobile application 302 and the home application 306 may each include an application socket that connects its associated application 302 or 306 to the active interface 304.

If multiple mobile applications 302(1)–302(N) are transmitting information to the home network 204, the mobile device 202 can aggregate 406 information sent from the multiple mobile applications 302(1)–302(N) into a single stream of information.

The mobile device 202 counts 408 the information as it transmits the information to the home application 306. The mobile device 202 counts the information in bytes, although any information size parameter may be used (bits, kilobytes, packets, etc.). The mobile device 202 may count the information by maintaining count values indicating the first and last bytes of the transmitted information.

For example, a TCP packet typically includes a sequence number that indicates a byte value representing the beginning of the information in that packet fragment. The mobile device 202 may store the sequence number of the first TCP packet fragment in the information stream as a first count value and the sequence number of the last TCP packet fragment in the information stream as a last count value. In this way, the mobile device 202 maintains a record of the amount of information transmitted to the home network 204.

The mobile device 202 also keeps 410 a copy of the information transmitted to the home network 204 in the buffer 220. The mobile device 202 may keep a physical copy of the transmitted information in the buffer 220. Alternatively, the mobile device 202 may keep a copy of the transmitted information through a pointer system instead of as a physical copy in the buffer 220.

In an example of a pointer system, the mobile device 202 may keep a copy of the transmitted information through counting the information. The buffer 220 may store a list of pointers. The pointers may include count values similar to the count values described above. The mobile device 202 may store count values for the first and last bytes of each transmitted fragment (or segment) of information. Alternatively, the mobile device 202 may store a count value for the first byte of information in each transmitted fragment along with the size of each transmitted fragment.

The mobile device 202 may otherwise process the information, e.g., compression, encryption, framing, etc., before sending the information along the active interface 304 as appropriate. Some processes that could affect the count (header compression, etc.) may be performed before the count, while other processes may be performed after the count (session compression, security measures such as encryption, etc.)

The information traverses the active interface 304 on its way to the home network 204, the home agent 234, and the home application 306. When the home agent 234 receives information, the home agent 234 splits (de-aggregates) 412 the information back into separate streams (if necessary) and forwards the information to the appropriate application(s) 306(1)–306(M), the home application 306 in this example.

The home agent 234 (or the home application 306 or home network 204 that includes the home application 306) counts 414 the received information and sends 416 the count to the mobile device 202. The home agent 234 may count the information similarly to the way that the mobile device 202 counts the information. For example, the home agent 234 may count the total amount of information received and send a total byte value to the mobile device 202.

Alternatively, the home agent 234 may determine the last byte of information received that seamlessly appends to a contiguous stream of information and send that byte count information to the mobile application 302, thereby indicating that the home agent 234 has received all transmitted information in the stream up to this byte count. The home agent 234 may have received additional information included in the stream, but because of lost information, the additional received information does not seamlessly append to other received information.

The home agent 234 may send the count information once it is calculated or may hold the count information and send the count information in accordance with predetermined regular intervals. The regular intervals may be time-based (e.g., every second), size-based (e.g., after receiving sixteen kilobytes of information), or based on other similar criteria.

The mobile application 302 receives the count information from the agent 234 and modifies 418 the buffer 220 accordingly. The mobile device 202 may modify the buffer 220 and perform some or all of the following operations described with reference to the mobile application 302 as well. The mobile application 302 deletes information received by the home agent 234 from the buffer 220. In this way, the mobile application 302 can track information sent to and successfully received by the home agent 234.

In deleting the information, the mobile application 302 may delete copies of information corresponding to the count information sent by the home agent 234. These copies of information may be deleted from the buffer 220 or from a location pointed to by pointers included in the buffer 220.

The mobile application 302 may not technically delete information, but may instead alter count values. For example, the mobile application 302 may remove information from the buffer 220 by adding a total amount of information received by the home agent 234 to both a first and a last byte counter included in the buffer 220. In another example, the mobile application 302 may replace a first byte count value included in the buffer 220 with a value indicating the last byte received by the home agent 234.

The transmission process 400 continues with the mobile application 302 sending information to the home application 306 along the active interface 304 and the home agent 234 acknowledging successfully received information by sending count values to the mobile application 302. If a handoff occurs, the mobile device 202 may be able to use the information included in the buffer 220 to determine what information to transmit to the home network 204 after the handoff.

Figure 5:
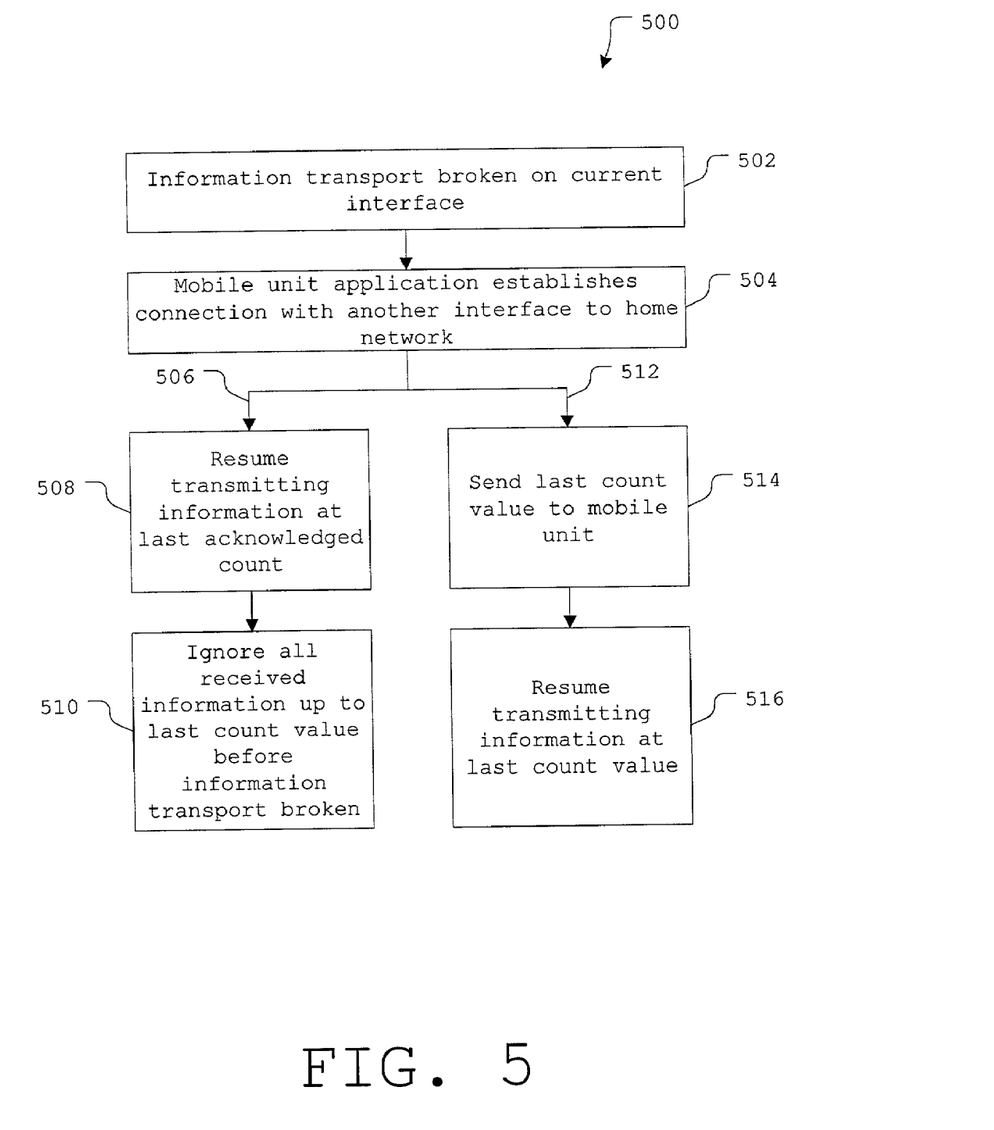

Referring to FIG. 5, a handoff process 500 indicates an example of how the mobile device 202 may handle handoff between connections and subsequent transmission of information to the home network 204. When a handoff occurs, information transport is broken 502 on the active interface 304.

The use of common information exchange information protocols for all available interfaces can facilitate handoff. For example, if all available interfaces use TCP, settings such as timers, packet size, and windows do not need to be reconfigured for handoff. Common protocol usage can be especially important for abrupt handoffs when the active interface is unexpectedly lost and a passive interface is promoted to active interface status.

To continue information transport to the home network 204, the mobile device 202 or the home network 204 (through, e.g., the home agent 234) establishes 504 a connection with the other entity using a different interface. The new interface can be chosen from among the available interfaces as described above.

Once handoff has occurred and a new active interface (still referred to as the active interface 304 in this discussion) has been established, the mobile device 202 determines what information to transmit or retransmit to the home network 204 over the active interface 304.

In one example along a first path 506, the mobile device 202 may resume 508 transmitting information to the home network 204 at the last acknowledged count value sent from the home agent 234 to the mobile device 202. In this scenario, the home network 204 ignores 512 all information received after the count value last calculated before the handoff occurred. In this way, the mobile device 202 and the home network 204 assume that any information sent after the last acknowledged count might have been lost in transit due to the handoff. Therefore, the mobile device 202 may retransmit some information to the home network 204, which explains why the home network 204 may ignore some previously sent information.

In another example along a second path 512, following the handoff, the mobile device 202 and the home agent 234 can synchronize the last count value. The mobile device 202 does not transmit any information to the home network 204 until the home agent 234 sends 514 a count value to the mobile device 202 (and the mobile device 202 receives the count value). The mobile device 202 resumes 516 transmitting information to the home network 204 starting at this count value. In this way, the count value sent by the home agent 234 should indicate if any information was lost during the handoff and the mobile device 202 can transmit information appropriately to ensure reliability.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. An article comprising;
a machine-readable medium that stores machine-executable instructions, the instructions causing a machine to:
automatically determine one of a plurality of available interfaces to use between a mobile device and a destination, said automatically determine one of a plurality of available interfaces using a list of ranked interfaces from most preferable to least preferable, and selecting a most preferable available interface on the list;
operate using a selected interface;
alter a record of information transmitted across a network from a mobile unit to a destination based on an acknowledgement by the destination of receipt of the transmitted information;
automatically determine whether at least one additional interface should be opened based on a usage parameter based on fees levied for use of each of respective interface, and if so, automatically open the at least one additional interface and adding the at least one additional interface to the list;
periodically rank the interfaces on the list of interfaces from most preferable to least preferable based on mobile device battery drain associated with usage of each respective interface; and
automatically determine if a more preferable interface is available, and is so, seamlessly change to the new interface by opening a new interface, close a current interface, and establish the new interface connection, and transmit information from the mobile unit to the destination based on the record after the mobile unit established a new interface connection to the destination including causing the machine to transmit information from the mobile unit to the destination after the mobile unit establishes the new interface connection.

2. The article of claim 1 in which the record includes an amount of information transmitted from the mobile unit to the destination.

3. The article at claim 1 in which the acknowledgment includes an amount of the received information.

4. The article of claim 1 further causing a machine to transmit information from the mobile unit to the destination after the mobile unit establishes the new interface connection starting with information immediately adjacent to the received information.

5. The article of claim 1 further causing a machine to remove the received information from the record.

6. The article of claim 1 in which the new interface includes a reliable link.

7. The article of claim 1 in which the destination includes a home network associated with the mobile unit.

8. A method comprising:
automatically determining one of a plurality of available interfaces to use between a mobile device and a destination, said automatically determining one of a plurality of available interfaces using a list of interfaces ranked from most preferable to least preferable, and selecting a most preferable available interface on the list;
operating using the determined interface;
altering a record of information transmitted across a network from a mobile unit to a destination based on an acknowledgment by the destination of receipt of the transmitted information;
automatically determining whether at least one additional interface should be opened based on a usage parameter, and if so automatically opening the at least one additional interface and adding the at least one additional interface to the list;
periodically ranking the interfaces on the list of interfaces from most preferable to least preferable based on mobile device battery drain associated with usage of each respective interface; and
automatically determining if a more preferable interface is available, and if so seamlessly changing to the more preferable interface by closing a current interface, and seamlessly establishing the new interface connection and transmitting information from the mobile unit to the destination based on the record otter the mobile unit establishes a new interface connection to the destination.

9. The method of claim 8 in which the record includes an amount of information transmitted from the mobile unit to the destination.

10. The method of claim 8 in which the acknowledgement includes an amount of the received information.

11. The method of claim 8 further comprising transmitting information from the mobile unit to the destination after the mobile unit establishes the new interface connection starting with information immediately adjacent to the received information.

12. The method of claim 8 further comprising removing the received information from the record.

13. The method of claim 8 which the new interface includes a reliable link.

14. The method of claim 8 in which the destination includes a home network associated with the mobile unit.

* * * * *